United States Patent
McMurtry et al.

(10) Patent No.: US 7,979,896 B2
(45) Date of Patent: Jul. 12, 2011

(54) AUTHORIZATION FOR ACCESS TO WEB SERVICE RESOURCES

(75) Inventors: Craig V. McMurtry, Sammammish, WA (US); Alexander T. Weinert, Seattle, WA (US); Vadim Meleshuk, Redmond, WA (US); Mark E. Gabarra, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 727 days.

(21) Appl. No.: 12/024,896

(22) Filed: Feb. 1, 2008

(65) Prior Publication Data

US 2008/0263638 A1    Oct. 23, 2008

Related U.S. Application Data

(60) Provisional application No. 60/912,993, filed on Apr. 20, 2007.

(51) Int. Cl.
*H04L 29/06* (2006.01)

(52) U.S. Cl. ............... 726/4; 726/26; 726/29; 709/225; 709/226

(58) Field of Classification Search .............. 726/26–31; 709/225
See application file for complete search history.

(56) References Cited

U.S. PATENT DOCUMENTS

| | | | |
|---|---|---|---|
| 6,134,591 A | 10/2000 | Nickles | |
| 6,675,261 B2 * | 1/2004 | Shandony | 711/121 |
| 6,732,101 B1 | 5/2004 | Cook | |
| 6,956,845 B2 | 10/2005 | Baker et al. | |
| 7,065,574 B1 | 6/2006 | Saulpaugh et al. | |
| 7,178,163 B2 | 2/2007 | Reeves, Jr. | |
| 2002/0166049 A1 | 11/2002 | Sinn | |
| 2003/0204719 A1 | 10/2003 | Ben-Itzhak | |
| 2004/0010719 A1 | 1/2004 | Daenen | |
| 2004/0019637 A1 | 1/2004 | Goodman et al. | |
| 2004/0139198 A1 | 7/2004 | Costa-Requena et al. | |
| 2005/0086197 A1 | 4/2005 | Boubez et al. | |
| 2005/0268333 A1 | 12/2005 | Betts et al. | |
| 2006/0015463 A1 | 1/2006 | Gupta et al. | |
| 2006/0015933 A1 | 1/2006 | Ballinger et al. | |
| 2006/0080440 A1 | 4/2006 | Vasandani et al. | |
| 2006/0180660 A1 | 8/2006 | Gray | |
| 2006/0230164 A1 | 10/2006 | Schlimmer et al. | |
| 2007/0005801 A1 | 1/2007 | Kumar et al. | |

(Continued)

FOREIGN PATENT DOCUMENTS

KR    20030048630    6/2003

(Continued)

OTHER PUBLICATIONS

Author: Brian Reistad et al. Title: Web Services Resource Transfer (WS-RT) Date: Aug. 2006, Publisher: IBM Website (http://download.boulder.ibm.com/ibmdl/pub/software/dw/specs/ws-rt/ws-rt-spec.pdf) Version: 1.0 pp. 21-25.*

(Continued)

*Primary Examiner* — Zachary A Davis
*Assistant Examiner* — Dustin Bone
(74) *Attorney, Agent, or Firm* — Merchant & Gould P.C.

(57) ABSTRACT

A web service includes a protected resource. A requester requests access to the protected resource by sending a request to the web service. The web service prevents access to the web service until the request has been authorized by an authorizer. After the request has been authorized by the authorizer, the web service allows the requester to access the protected resource.

18 Claims, 5 Drawing Sheets

U.S. PATENT DOCUMENTS

| | | |
|---|---|---|
| 2007/0043813 A1 | 2/2007 | Pickup |
| 2007/0067494 A1 | 3/2007 | Savchenko et al. |
| 2007/0094283 A1 | 4/2007 | Fung et al. |

FOREIGN PATENT DOCUMENTS

| | | |
|---|---|---|
| KR | 20060100920 | 9/2006 |
| WO | WO 02/12987 | 2/2002 |

OTHER PUBLICATIONS

International Search Report, Aug. 21, 2008, 10 pages.
Exhibit A, Adam et al.; A Content-Based Authorization Model for Digital Libraries; Mar./Apr. 2002; 5 pages.
Exhibit B, Bricks Foundation, User Authentication; Copyright 2005; 6 pages.
Exhibit C, Ferguson et al.; Secure, Reliable, Transacted Web Services; Oct. 28, 2003; 27 pages.
Exhibit D, Fox et al.; Towards Flexible Messaging for Soap Based Services; Copyright 2004; 11 pages.
Exhibit E, Yoon et al.; Developing Secure Web Services for Computational Portals; published at least as early as Apr. 19, 2007; 6 pages.
European Search Report, Apr. 29, 2011, 8 pages.
Xu et al., Proceedings of the 10th International Conference on Computer Supported Cooperative Work in Design, "A Federated Integration of Networked Manufacturing Platforms", May 1, 2006, 6 pages.
Banks, Oasis; "Web Services Resource Framework (WSRF)—Primer", Dec. 7, 2005, 42 pages.

* cited by examiner

AUTHORIZATION FOR ACCESS TO WEB SERVICE RESOURCES

RELATED APPLICATIONS

This Application claims priority to U.S. Provisional Application No. 60/912,993 filed on Apr. 20, 2007, titled "AUTHORIZATION FOR ACCESS TO WEB SERVICE RESOURCES," the disclosure of which is hereby incorporated by reference in its entirety.

BACKGROUND

Web services have developed in recent years as a way to increasingly connect people, information, and processes. One of the benefits of Web services is the ability of Web services to operate across multiple platforms and the ease at which modifications can be made to a Web service. One of the reasons that Web services have been so successful is the use of XML as a standard and universal language for representing and transmitting structured data that is independent of programming language, software platform, and hardware.

There are many situations in which it is desirable to protect Web service resources, such that the resources may only be accessed or used by the appropriate people or systems. Conventional methods for protecting Web service resources focus on authentication, and in particular focus on defining trust relationships. Conventional systems often allow any person or device accessing the Web service from a trusted location to access to the Web service and associated resources. These conventional systems do not provide a way for a third party to provide authorization for a particular request to access or use a Web service. Rather, Web services are often configured to trust anyone communicating from a trusted location. These and other problems are addressed by various embodiments according to the present disclosure.

SUMMARY

Embodiments of the present disclosure generally relate to authorization involving a Web service. In one non-limiting example, a Web service includes a protected resource. A requester sends a request to the Web service relating to the protected resource. The Web service operates to prohibit access to the protected resource until an authorization is received by the Web service from an authorizer.

As discussed herein, an aspect of some embodiments relates to a computing system for controlling access to a protected Web service resource. The computing system includes a communication device, a processor, and memory. The communication device communicates across a communication network. The processor is communicatively connected to the communication device. The memory stores program instructions, which when executed by the processor cause the computing system to perform operations comprising: receiving a request to access a protected Web service resource from the communication network; determining whether the request to access the protected Web service resource has been authorized; if the request has not been authorized, denying access to the protected Web service resource; and if the request has been authorized, permitting access to the protected Web service resource.

Another aspect of some embodiments relates to a method of authorizing access to a Web service resource. The method includes receiving a request from a requester identifying a Web service resource; determining that authorization is required to access the Web service resource; receiving authorization from an authorizer which authorizes the requester to access the Web service resource; and communicating the authorization to the requester.

A further aspect of some embodiments relates to a computer readable medium containing computer executable instructions which when executed by a computer perform a method of authorizing access to of a protected resource. The method comprises receiving a request identifying the protected resource of a Web service; receiving an authorization which authorizes use of the protected resource of the Web service; determining that the request has been authorized; and communicating the authorization to the requester.

This summary is provided to introduce a selection of concepts in a simplified form that are further described below in the Detailed Description. This Summary is not intended to identify key or essential features of the claimed subject matter, nor is it intended to be used in any way as to limit the scope of the claimed subject matter.

DETAILED DESCRIPTION

Figure 1:
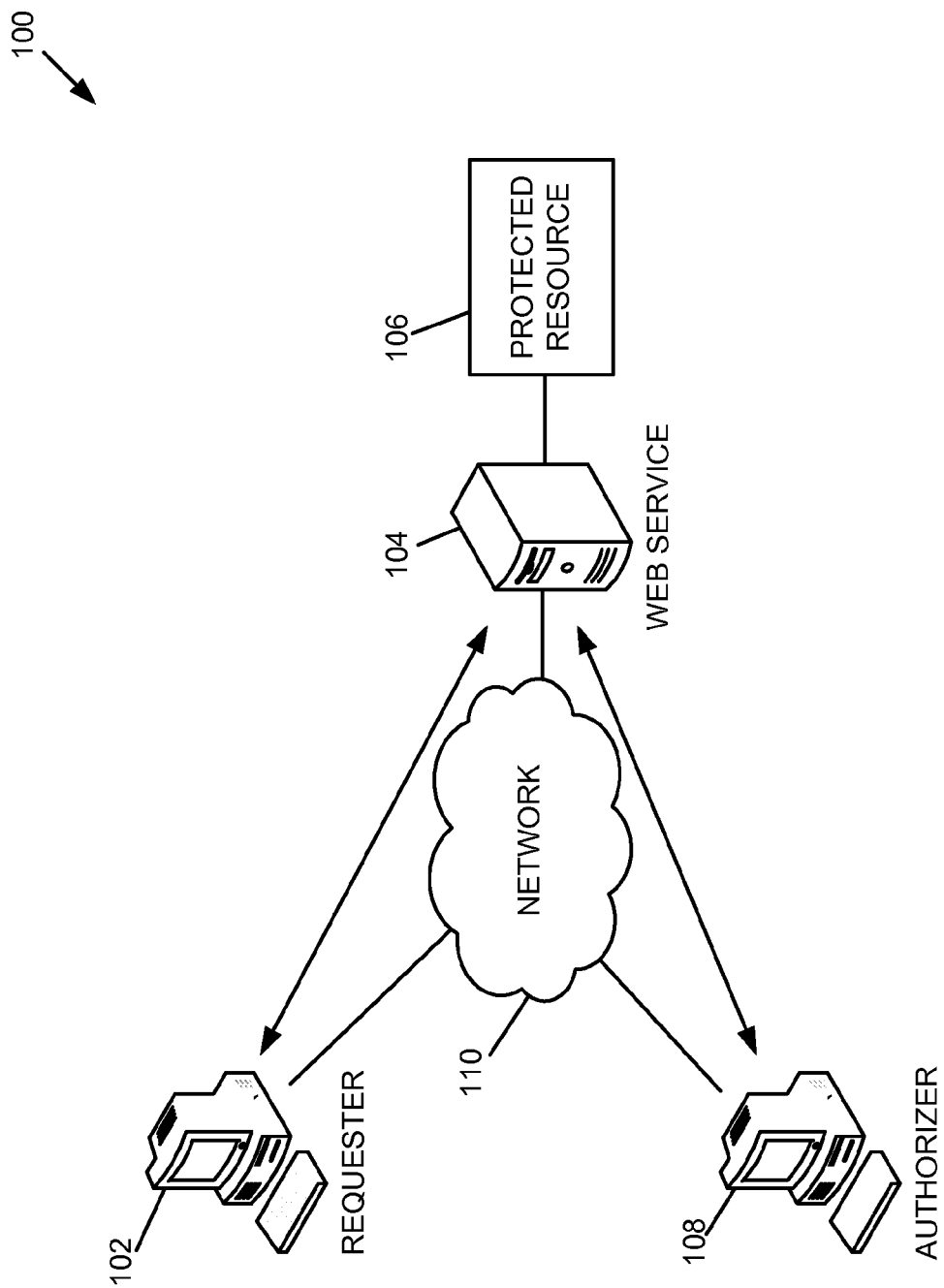
FIG. 1 is a block diagram of an example authorization system.

This disclosure will now more fully describe exemplary embodiments with reference to the accompanying drawings, in which specific embodiments are shown. Other aspects may, however, be embodied in many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

Embodiments of the present disclosure generally relate to authorization involving a Web service. In one non-limiting example, a Web service includes a protected resource. A requester sends a request to the Web service relating to the protected resource. The Web service operates to prohibit access to the protected resource until an authorization is received by the Web service from an authorizer.

FIG. 1 is a block diagram of an example authorization system 100. Authorization system 100 includes requester 102, Web service 104, protected resource 106, and authorizer 108. Requester 102, Web service 104, and authorizer 108 are all communicatively connected to network 110.

Figure 2:
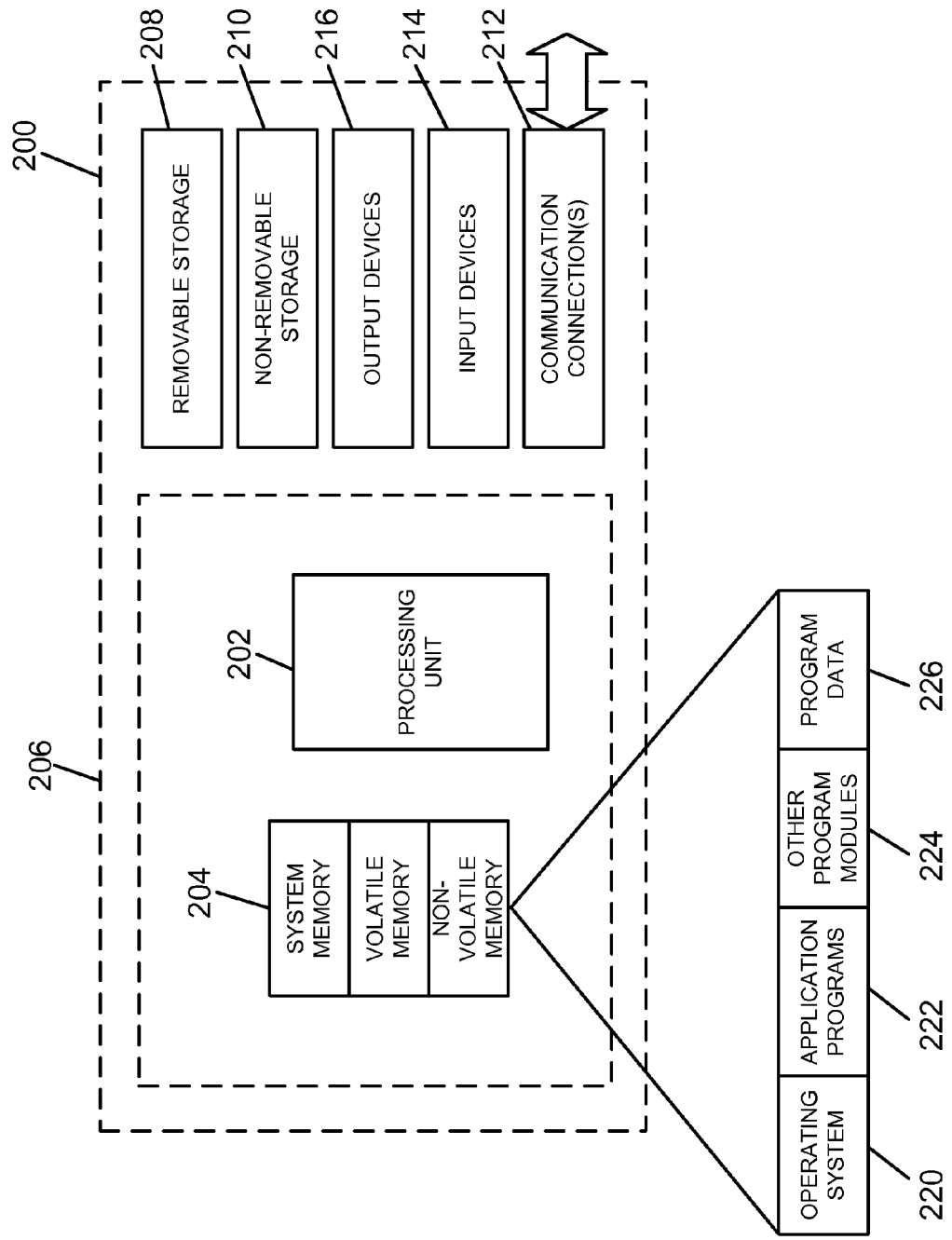
FIG. 2 is an exemplary computing system for implementing aspects of the authorization system shown in FIG. 1.

In one embodiment, requester 102 is a computing system in data communication with Web service 104 across network 110, such as computing system 200, shown in FIG. 2. In some embodiments, requester 102 receives input from a user that provides input through a user interface to the computing system and makes decisions for the computing system. The user interacts with the computing system through one or more user interfaces, such as a display, a mouse, a keyboard, and the like. In some embodiments, requester 102 operates a Browser software application, such as the INTERNET EXPLORER® Internet browser, which communicates using a network protocol, such as hypertext transfer protocol (HTTP), with Web service 104 across network 110. In other embodiments, one or more software applications other than an Internet browser operate on requester 102. In the illustrated embodiment, requester 102 seeks to access protected resource 106 of Web service 104.

In one embodiment, Web service 104 is a computing system, such as a Web server, operating a Web service. In general, Web service 104 provides a useful functionality involving protected resource 106. The Web service can be accessed through network 110, using a network protocol. Web services can be used to provide an endless variety of useful functions. One example is a calendar service. A client provides requests to the server, such as to add an appointment to the calendar. The Web service stores the appointment for the client. Later, the client can request to view the stored appointment, which is provided by the Web service. Another example of a possible Web service is a service that maintains an e-mail distribution list. A client identifies the users to be stored in the mailing list. The server stores the list for the client. Later, the client can request that a message be sent by the server to all members of the distribution list. The Web service performs the requested function. Other examples of possible web services include: adding a user name to a security group, such as the group of system administrators; modifying the authorization requirements of a given action; providing access to personal information of a user, such as when requested by a human resources staff member or an emergency worker; and limiting access to records to a particular group of users and/or those who are specifically authorized to access the records, such as by the process described herein.

One example of Web service 104 is computing system 200, shown in FIG. 2. Web service 104 is in data communication with requester 102 and authorizer 108 across network 110. One example of a Web service is a computing system configured to communicate across network 110 according to the Simple Object Access Protocol ("SOAP"), also sometimes referred to as Service Oriented Architecture Protocol. SOAP is a protocol currently maintained by the XML Protocol Working Group of the World Wide Web Consortium, an international standards organization for the World Wide Web. SOAP utilizes extensible markup language ("XML") as the standard message format. In one embodiment, SOAP messages are exchanged using a hypertext transfer protocol ("HTTP"), such as HTTP 1.1.

HTTP is a transfer protocol that defines a pattern of communication beginning with a request and ending with a response. The request message is a message sent from a client to the server (such as from requester 102 to Web service 104), which generally includes a request, a header, a blank line, and a message body. The request includes an identification of a resource to which the message pertains. HTTP defines multiple request methods that indicate a desired action to be performed on the identified resource. One example of an HTTP request method is the Get method. The Get method requests a representation, or a copy, of the identified resource. Another example of an HTTP request method is the Put method. The Put method uploads a representation of the identified resource. A request message that contains a Get command is referred to as a Get message or a Get request. A request message that contains a Put command is referred to as a Put message or a Put request. After the request has been received by the Web server, the Web server provides a response to the client. The response includes a status line, a header, a blank line, and the message body. The status line includes a status code and a textual reason phrase (such as "Not Found"). The content of the response depends on the content of the request. For example, a response to a Get message will include a representation of the identified resource, as requested.

SOAP also defines a message format referred to as a SOAP fault. A SOAP fault is generally used to carry error information in a SOAP message format. SOAP faults can also be used by a Web server to communicate a response to a client following a request. In one example, SOAP 1.2 is used, such that the SOAP fault contains a context header, and a body. The context header includes an identifier identifying the original request and any authorization processes that have been found to be associated with the request. The body includes the contents of the detail element, described herein. The content of the detail element signifies that the requested resource requires authorization before the Web service can proceed further.

In another embodiment, communication with Web service 104 involves SOAP communications conforming to the Web Services Resource Transfer (WS-RT) protocol. WS-RT defines a communication protocol for accessing representations of Web service-based resources. WS-RT includes Create, Get, and Put messages. The Create message is used to generate a representation of an object, such as an XML representation. The desired representation is included in the body of the Create message. The Get message can be used to retrieve a representation of a fragment of a representation of a resource. A fragment of a representation is a part of a representation, such that it does not have to retrieve the entire representation. The Get message includes a unique identifier of the desired object in the header of the message. Thus, the Get message is used to request a single object of which the unique identifier is already known. The Put message can be used to upload a representation, or a fragment of a representation to a resource. WS-RT also defines fault operations to communicate a response to a client. As used herein, Get, Put, and Fault messages refer to general types of messages encompassing a variety of protocols (including HTTP, SOAP, and various Web service protocols), unless a particular protocol is specifically identified.

Another embodiment utilizes the WS-Enumeration protocol, which is also maintained by the World Wide Web Consortium. WS-Enumeration defines an enumerate message. The enumerate message is sent along with an expression of a query. In one embodiment the query is written in the XPath language. As one example, the query requests a representation of all resources that match a certain set of criteria. The Web service responds to the enumerate message with the identifier of an enumeration context. The client then sends a Pull message including the enumeration context identifier, specifying how many of the objects matching the query should be retrieved. The Web service then responds with the specified number of resources that match the query. Subsequent Pull messages can then be sent to the server to retrieve another batch of resources matching the query. This process is sometimes generally referred to herein as sending an enumerate message and receiving the response. One of the benefits of the enumerate message is that it enables a client to query for any number of resources that match a certain criteria.

Another embodiment utilizes the Web Services Transfer (WS-Tx) protocol. In addition to other useful functions, WS-Tx defines a delete message for deleting a protected resource.

In the illustrated embodiment, Web service 104 includes protected resource 106. Protected resources include, for example, functions performed by a Web service 104 and data stored by Web Service 104 that can only be accessed, used, or modified by an authorized client. For example, if Web service 104 provides the service of maintaining a group distribution list, the group distribution list is a protected resource that can only be accessed, used, or modified by an authorized client. As another example, protected resource 106 is an entry in a directory. In another embodiment, protected resource 106 is a record in a database. In another embodiment, protected resource 106 is a file or part of a file stored on a memory storage device. Other embodiments use other forms of protected resources 106.

The term "access" is sometimes used herein to refer to any change, modification, addition, deletion, or use of protected resource 106. In some embodiments, use of protected resource 106 includes obtaining data stored in the protected resource 106. In some embodiments, non-authorized clients can gain access to protected resource 106. For example, a network administrator can have access in some embodiments, even if not specifically authorized by an authorizer.

In possible embodiments, authorizer 108 is a computing system in data communication with Web service 104. In some embodiments, authorizer 108 operates software capable of communicating messages to Web service 104 across network 110. For example, authorizer 108 operates the MICROSOFT® OUTLOOK® messaging and collaboration client. The messaging and collaboration client is capable of sending electronic messages across network 110 to Web service 104. In the illustrated embodiment, Web service 104 relies on authorizer 108 to determine whether or not a user should be authorized to use protected resource 106. In some embodiments, authorizer 108 and Web service 104 operate on the same computing system.

Network 110 is a data communication path between requester 102, Web service 104, and authorizer 108. In one embodiment, network 110 is the Internet. In other embodiments, network 110 is a local area network, Intranet, wireless network, or any other communication path capable of communicating data from one processing device to another processing device.

In some embodiments, data communications across network 110 are performed according to a network communication protocol. In one possible example, HTTP is used to communicate data between requester 102, Web service 104, and authorizer 108. In another embodiment, the SOAP is followed. In another embodiment, the WS-RT protocol is followed. Other embodiments use other data communication protocols.

In some embodiments, users are authenticated to ensure that they are who they claim to be. One example of authentication is described in U.S. Publ. No. 2008/0263652 (U.S. patent application Ser. No. 12/024,901), titled "REQUEST-SPECIFIC AUTHENTICATION FOR ACCESSING WEB SERVICE RESOURCES," filed on Feb. 1, 2008, by Craig V. McMurtry, Alexander T. Weinert, Vadim Meleshuk, and Mark E. Gabarra, the entire disclosure of which is hereby incorporated by reference.

FIG. 2 is an exemplary computing system 200 for implementing aspects of the present disclosure. In one embodiment, computing system 200 is Web service 104. In another embodiment, computing system 200 is requester 102. In another embodiment, computing system 200 is authorizer 108.

In its most basic configuration, computing system 200 typically includes at least one processing unit 202 and memory 204. Depending on the exact configuration and type of computing system, memory 204 may be volatile (such as RAM), non-volatile (such as ROM, flash memory, etc.) or some combination of the two. This most basic configuration is illustrated in FIG. 2 by dashed line 206. Additionally, computing system 200 may also have additional features/functionality. For example, computing system 200 may also include additional storage (removable and/or non-removable) including, but not limited to, magnetic or optical disks or tape. Such additional storage is illustrated in FIG. 2 by removable storage 208 and non-removable storage 210.

Computing system 200 typically includes at least some form of computer readable media. Computer readable media can be any available media that can be accessed by computing system 200. By way of example, and not limitation, computer readable media may comprise computer storage media and communication media. Computer storage media includes volatile and nonvolatile, removable and non-removable media implemented in any method or technology for storage of information such as computer readable instructions, data structure, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and that can be accessed by computing system 200. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Any such computer storage media may be part of computing system 200.

Computing system 200 may also contain communications connection(s) 212 that allow the computing system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing system 200 may also have input device(s) 214 such as keyboard, mouse, pen, voice input device, touch input device, etc. Output device(s) 216 such as a display, speakers, printer, etc. may also be included. All these devices are well know in the art and need not be discussed at length here.

In some embodiments, memory 204 includes one or more of operating system 220, application programs 222, other program modules 224, and program data 226. Examples of application programs 222 include a Web service software application, an Internet Browser software application, a messaging and collaboration client software application, or a variety of other software applications. In possible embodiments, either of program modules 224 and program data 226 includes protected data.

Figure 3:
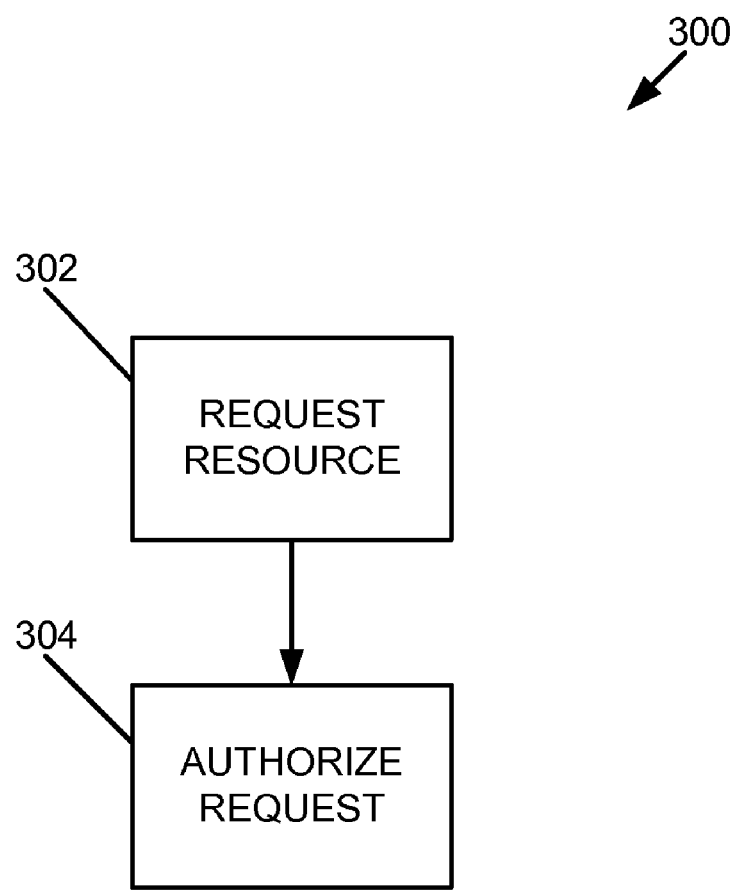
FIG. 3 is a flow chart illustrating an example method of authorizing access to a Web service resource.

FIG. 3 is a flow chart illustrating an example method 300 of authorizing access to a Web service resource. Method 300 includes operation 302 and operation 304. Method 300 begins with operation 302, during which a request is made relating to a resource. In one embodiment, operation 302 involves an attempt by a requester to utilize a function provided by a protected resource. Because the resource is protected, the requester is not automatically allowed to utilize the protected resource. Rather, the request must first be authorized. Therefore, operation 302 is next performed during which the request is authorized. In one embodiment, operation 302 involves receiving an authorization from an authorizer. Once the authorization is received, the requester is allowed to utilize the protected resource. In other possible embodiments, operation 302 involves a request to access a protected resource.

Figure 4:
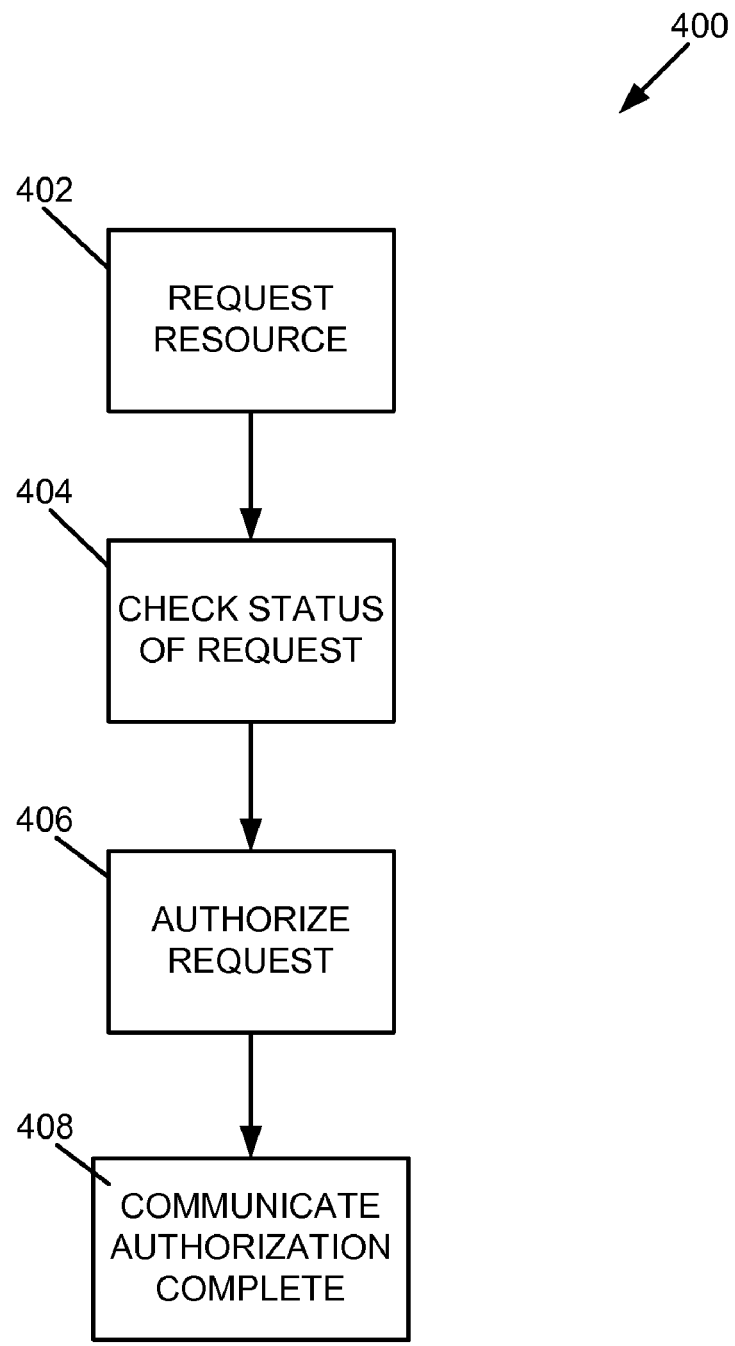
FIG. 4 is flow chart illustrating another example method of authorizing access to a Web service resource.

FIG. 4 is a flow chart illustrating an example method 400 of authorizing use of a Web service resource. Method 400 includes operations 402, 404, 406, and 408. Method 400 begins with operation 402 during which a resource request is made. In one possible embodiment, operation 402 involves sending a request from requester 102 to Web service 104. Web service 104 receives the resource request and determines that the request pertains to a protected resource. Web service 104 then evaluates whether requester 102 has been authorized to access the protected resource. In the illustrated example, requester 102 has not yet been authorized, and therefore access to the resource is prohibited until authorization occurs.

In a possible embodiment, operation 404 is then performed to check on the status of the resource request. In some embodiments, operation 404 is not performed. In one example of operation 404, requester 102 periodically polls Web service 104 to determine the status of the request. Web service 104 responds to requester 102 with the status. In the illustrated example, Web service 104 informs requester 102 that the request has not yet been authorized. In some embodiments, polling is performed when a user of requester 102 selects a refresh option of an Internet Browser software application. In another embodiment, polling is performed periodically by a software application running on requester 102.

Operation 406 is performed after the resource has been requested in operation 402, to authorize the request. In one embodiment, operation 406 involves sending a message from authorizer 108 to Web service 104 to authorize the request. After the request has been authorized, operation 408 is performed to communicate that the request has been authorized, such as to inform the requester that the protected resource can now be utilized. In another embodiment, rather than (or in addition to) communicating that the request has been authorized, operation 408 proceeds to provide access to the protected resource 106 as requested.

Figure 5:
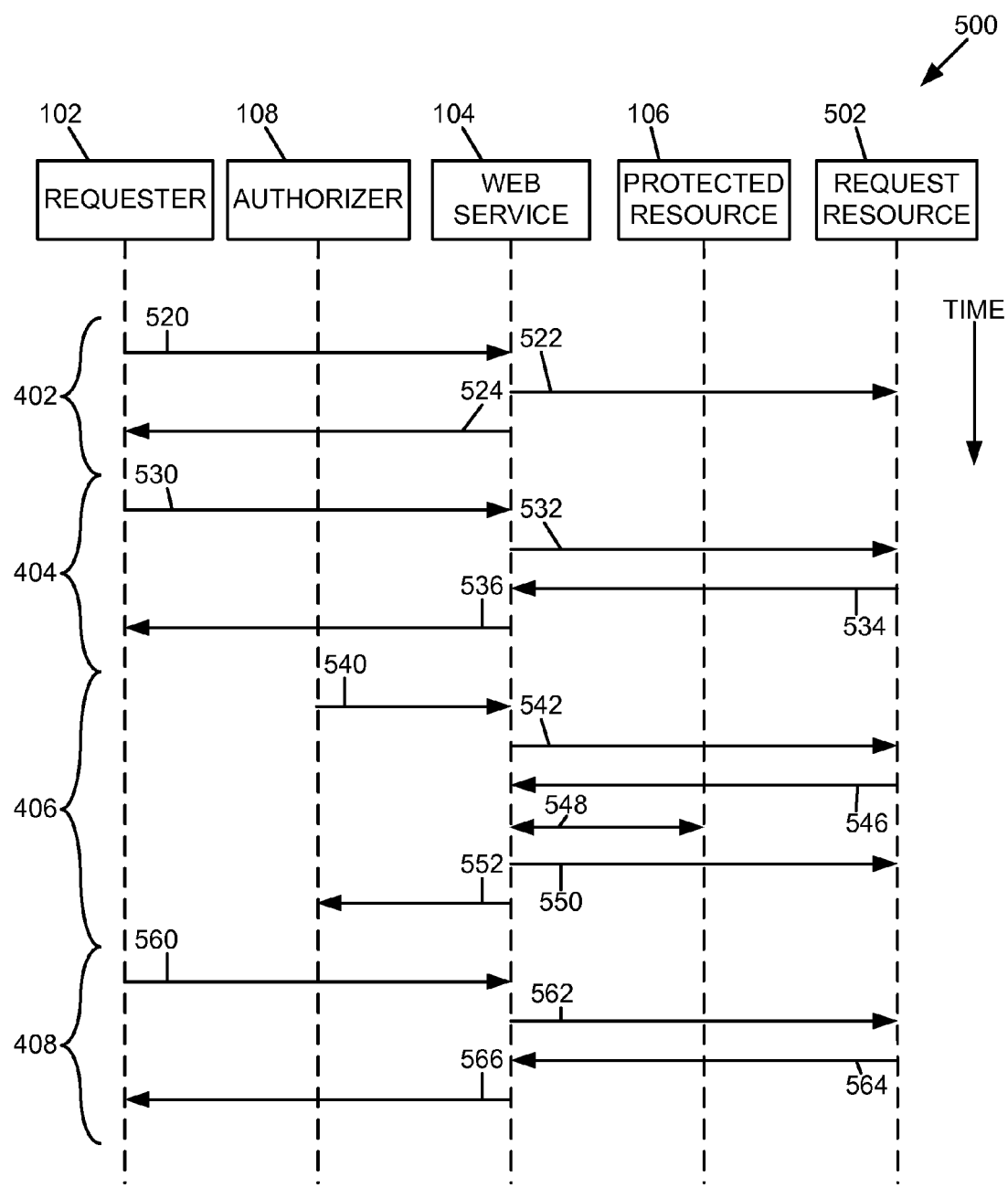
FIG. 5 is a flow chart further illustrating an example of the method of authorizing access to a Web service resource, shown in FIG. 4.

FIG. 5 is flow chart illustrating an example method 500 of authorizing use of a Web service resource. In this example, method 500 involves the interaction of requester 102, authorizer 108, and Web service 104. In addition, method 500 includes more specific examples of operations 402, 404, 406, and 408, shown and described with reference to FIG. 4. In FIG. 5, communications that are sent from a system are represented by an arrow originating from the dotted line extending down from the respective system. In addition, communications received by a system are represented by an arrow terminating at the dotted line extending down from the respective system.

In the illustrated scenario, requester 102 desires to gain access to a protected resource 106 operating on and protected by Web service 104. Before access is granted, however, Web service 104 requires that authorization be received from authorizer 108.

In this embodiment, method 500 includes operations 402, 404, 406, and 408. Method 500 begins with operation 402 during which a request is made by requester 102 to Web service 104 to utilize protected resource 106. Operation 404 is optionally performed following operation 402, during which requester 102 checks on the status of the request. Operation 406 is performed after operation 402. Operation 406 involves sending an authorization from authorizer 108 to Web service 104 to authorize the request. Once the request has been authorized, operation 408 is performed, during which a communication is sent to requester 102 from Web service 104 to inform requester 102 that the request has been authorized.

To fully describe one example method 500, operation 402, 404, 406, and 408 are each illustrated as containing various operations. These operations are shown as only one example of a method of authorizing use of a Web service resource. In this embodiment, operation 402 includes operations 520, 522, and 524. Operation 520 is first performed, during which a request is sent from requester 102 to Web service 104, requesting use of or access to protected resource 106. In one embodiment, operation 520 involves sending a Create message from requester 102 to Web service 104. Web service 104 receives the request, and evaluates whether or not the protected resource 106 requires authorization, and if so, whether requester 102 has been previously authorized. If not, Web service 104 determines that authorization is required before requester 102 can access or use protected resource 106.

Once Web service 104 determines that authorization is required, operation 522 is performed during which Web service 104 generates request resource 502. Request resource 502 is used by Web service 104 to track the status of the request received in operation 520. For example, request resource 502 contains data that identifies whether or not the request made in operation 520 has been authorized. When first generated, request resource 502 identifies that the request has not yet been authorized. If authorization is later received, request resource 502 is updated to identify that the request has been authorized (such as performed in operation 550 described herein). In one embodiment, request resource 502 is defined by an extensible markup language (XML). One embodiment of an example request resource schema is as follows.

---

EXAMPLE REQUEST RESOURCE SCHEMA

<?xml version='1.0' encoding='utf-8'?>
<xsd:schema
 xmlns:xsd='http://www.w3.org/2001/XMLSchema'
 xmlns:idm='http://schema.microsoft.com/2006/11/IdentityManagement'
   targetNamespace='http://schema.microsoft.com/2006/11/
   IdentityManagement'>
 <xsd:simpleType name='RequestStatusType' >
  <xsd:restriction
   base='idm:String'>
   <xsd:enumeration value='Cancelled' />
   <xsd:enumeration value='NotFound' />
   <xsd:enumeration value='Denied' />
   <xsd:enumeration value='Authenticating' />
   <xsd:enumeration value='Authenticated' />
   <xsd:enumeration value='Authorizing' />
   <xsd:enumeration value='Authorized' />
   <xsd:enumeration value='Processing' />
   <xsd:enumeration value='ProcessingEffects' />

EXAMPLE REQUEST RESOURCE SCHEMA

```
    <xsd:enumeration value='Completed' />
  </xsd:restriction>
</xsd:simpleType>
<xsd:complexType
name='RequestDetailsType'>
  <xsd:extension
  base='IdentityObject'>
    <xsd:sequence>
      <xsd:element
        name='ReferenceProperty'
        type='idm:XmlTextType'
        minOccurs='0'
        maxOccurs='1'/>
      <xsd:element
        name='Action'
        type='idm:String'
        minOccurs='1'
        maxOccurs='1'/>
      <xsd:element
        name='Body'
        type='idm:XmlTextType'
        minOccurs='1'
        maxOccurs='1'/>
    </xsd:sequence>
  </xsd:extension>
</xsd:complexType>
<xsd:complexType
name='ApprovalActionType'>
  <xsd:extension
  base='IdentityObject'>
    <xsd:sequence>
      <xsd:element
        name='RequiredApproval'
        type='idm:Reference'
        minOccurs='1'
        maxOccurs='1'/>
    </xsd:sequence>
  </xsd:extension>
</xsd:complexType>
<xsd:complexType
name='ProcessType'>
  <xsd:extension
  base='IdentityObject'>
    <xsd:sequence>
      <xsd:element
        name='Actions'
        type='idm:ReferenceCollection'
        minOccurs='0'
        maxOccurs='1'/>
    </xsd:sequence>
  </xsd:extension>
</xsd:complexType>
<xsd:complexType
name='RequestType'>
  <xsd:complexContent>
    <xsd:extension
    base='IdentityObject'>
      <xsd:sequence>
        <xsd:element
          name='Status'
          type='idm:RequestStatusType'
          minOccurs='1'
          maxOccurs='1'/>
        <xsd:element
          name='Details'
          type='idm:Reference'
          minOccurs='1'
          maxOccurs='1'/>
        <xsd:element
          name='ApprovalProcesses'
          type='idm:ReferenceCollection'
          minOccurs='0'
          maxOccurs='1'/>
        <xsd:element
          name='ApprovalResponses'
          type='idm:ReferenceCollection'
          minOccurs='0'
          maxOccurs='1'/>
```

EXAMPLE REQUEST RESOURCE SCHEMA

```
        <xsd:element
          name='Data'
          type='idm:XmlTextType'
          minOccurs='0'
          maxOccurs='1'/>
      </xsd:sequence>
    </xsd:extension>
  </xsd:complexContent>
</xsd:complexType>
<xsd:element
  Name='Request'
  type='idm:RequestType' />
</xsd:schema>
```

In the example request resource schema provided above, a number of elements are defined including Status, Details, ApprovalProcesses, ApprovalResponses, Data, ReferenceProperty, Action, Body, RequiredApproval, Actions, and Request. In this example, the Status element contains the status of the request, such as authorized or unauthorized. The Details element includes a description of the original request. The ApprovalProcesses element stores the unique identifiers of approval processes associated with the request. The ApprovalResponses element contains unique identifiers of approval responses. The Data element contains any data to be retrieved by the original request. The ReferenceProperty element contains the Web Services Addressing ("WS-Addressing") reference property that identifies the target of the original request. The Action element contains the action header of the original request. The RequiredApproval element stores the unique identifier of an approval object, such as an identifier of authorizer 108. In this way, each protected resource can include a different authorizer that is allowed to provide authorization for that resource. This is useful in some embodiments to enable authorizations that relate to one topic or type of resource to be handled by one authorizer, and to enable authorizations that relate to another topic or type of resource to be handled by another authorizer. The Actions element contains the unique identifiers of the approval action types used to authorize the request. The Request element is a wrapper that contains a copy of, for example, the Status, Details, ApprovalProcesses, and Data elements.

Another example of a request resource schema is as follows.

SECOND EXAMPLE REQUEST RESOURCE SCHEMA

```
<?xml version='1.0' encoding='utf-8'?>
<xs:schema
  elementFormDefault='qualified'
  targetNamespace='http://schemas.microsoft.com/2006/11/
  IdentityManagement'
  xmlns:xs='http://www.w3.org/2001/XMLSchema'
  xmlns:idm='http://schemas.microsoft.com/2006/11/
  IdentityManagement'>
  <xs:include
  schemaLocation='http://sharepoint/sites/IdMT/Raven/
  Shared%20Documents/Feature%20Team%20Documents/Schema/Schema/
  Raven.Schema.IdentityManagementObject.Schema.M1.xsd' />
  <xs:complexType
    name='RequestType'>
    <xs:complexContent
      mixed='false'>
      <xs:extension
      base='idm:ResourceType'>
        <xs:sequence>
          <xs:element
```

| SECOND EXAMPLE REQUEST RESOURCE SCHEMA |
|---|
|     name='Parameter'<br>    minOccurs='0'<br>    maxOccurs='unbounded'<br>    nillable='true'<br>    type='idm:String' /><br>  <xs:element<br>    name='Operation'<br>    minOccurs='1'<br>    maxOccurs='1'<br>    nillable='true'<br>    type='idm:RequestOperationType' /><br>  <xs:element<br>    name='Target'<br>    minOccurs='0'<br>    maxOccurs='1'<br>    nillable='true'<br>    type='idm:Reference'/><br>  <xs:element<br>    name='BusinessJustification'<br>    minOccurs='0'<br>    maxOccurs='1'<br>    nillable='true'<br>    type='idm:String'/><br>  <xs:element<br>    name='RequestStatus'<br>    minOccurs='1'<br>    maxOccurs='1'<br>    nillable='true'<br>    type='idm:RequestStatusType'/><br>  <xs:element<br>    name='RequestStatusDetails'<br>    minOccurs='0'<br>    maxOccurs='unbounded'<br>    nillable='true'<br>    type='idm:String'/><br>  <xs:element<br>    name='AuthenticationWorkflowInstance'<br>    minOccurs='0'<br>    maxOccurs='unbounded'<br>    nillable='true'<br>    type='idm:Reference'/><br>  <xs:element<br>    name='AuthorizationWorkflowInstance'<br>    minOccurs='0'<br>    maxOccurs='unbounded'<br>    nillable='true'<br>    type='idm:Reference'/><br>  <xs:element<br>    name='ActionWorkflowInstance'<br>    minOccurs='0'<br>    maxOccurs='unbounded'<br>    nillable='true'<br>    type='idm:Reference'/><br>  </xs:sequence><br>  </xs:extension><br></xs:complexContent><br></xs:complexType><br><xs:simpleType name='OperationType'><br>  <xs:restriction base='xs:string'><br>    <xs:enumeration value='Create' /><br>    <xs:enumeration value='Read' /><br>    <xs:enumeration value='Update' /><br>    <xs:enumeration value='Delete' /><br>    <xs:enumeration value='Enumerate' /><br>    <xs:enumeration value='SystemEvent' /><br>  </xs:restriction><br></xs:simpleType><br><xs:simpleType name='RequestStatusType'><br>  <xs:restriction base='xs:string'><br>    <xs:enumeration value='NotFound' /><br>    <xs:enumeration value='Validating' /><br>    <xs:enumeration value='Validated' /><br>    <xs:enumeration value='Authenticating' /><br>    <xs:enumeration value='Authenticated' /><br>    <xs:enumeration value='Authorizing' /><br>    <xs:enumeration value='Authorized' /><br>    <xs:enumeration value='Denied' /><br>    <xs:enumeration value='Processing' /> |

| SECOND EXAMPLE REQUEST RESOURCE SCHEMA |
|---|
|     <xs:enumeration value='ProcessingEffects' /><br>    <xs:enumeration value='Completed' /><br>    <xs:enumeration value='Canceled' /><br>  </xs:restriction><br></xs:simpleType><br><xs:element<br>  name='ApprovalResponse'<br>  nillable='true'<br>  type='idm:ApprovalResponseType' /><br></xs:schema> |

In the second example request resource schema provided above, a number of elements are defined including Parameter, Operation, Target, BusinessJustification, RequestStatus, RequestStatusDetails, AuthenticationWorkflowInstance, AuthorizationWorkflowInstance, and ActionWorkflowInstance. In this example, the Parameter element is written by a Request Dispatcher of Web service 104. The Parameter element contains a normalized representation of the body of the message sent in operation 524.

The Operation element contains an identification of the operation requested by the request made in operation 520. In some embodiments, the Operation element contains a value selected from "Create", "Read", "Update", "Delete", "Enumerate", and "SystemEvent." The Target element contains a reference to a target object to which the operation is referring.

The BusinessJustification element contains a text-based message entered by requester 102 that provides additional information for authorizer 108 as to why access to protected resource 106 is needed.

The RequestStatus element contains the current status of the request. In some embodiments, RequestStatus contains values selected from "Not Found", "Validating", "Validated", "Authenticating", "Authenticated", "Authorizing", "Authorized", "Denied", "Processing", "ProcessingEffects", "Completed", and "Cancelled".

The RequestStatusDetails element contains an attribute that is used to provide feedback to Requester 102. Examples of feedback include an error message or information to be sent to requester 102.

The AuthenticationWorkflowInstance contains a reference to all authentication workflow instances that have been launched.

The AuthorizationWorkflowInstance contains a reference to all authorization workflow instances that have been launched.

The ActionWorkflowInstance contains a reference to all action workflow instances that have been launched.

Request resource 502 is stored such that it can be accessed by Web service 104. In one possible example, request resource 502 is an entry in a directory. In another embodiment, request resource 502 is a record in a database. In another embodiment, request resource 502 is a file or part of a file stored on a memory storage device.

Following the generation of request resource 502, operation 524 is then performed to inform requester 102 that authorization is required before the request can be processed by Web service 104. In one embodiment, operation 524 involves sending a response in the form of a SOAP fault. The SOAP fault includes the content of the detail element. In some embodiments, the detail element also includes a WS-Addressing endpoint reference, which contains an address of a web services endpoint (such as a WS-RT endpoint). In some embodiments, the endpoint reference contains a reference property referring to the resource. In some embodiments, operation 524 is performed before operation 522.

Following operation 402, an optional operation 404 is performed. Operation 404 is generally a process in which requester 102 is able to check on the status of the request, such as to determine whether or not the request has been authorized. Operation 404 includes operations 530, 532, 534, and 536. Operation 404 begins with operation 530 during which requester 102 sends a query to Web service 104 inquiring on the status of the request. In one embodiment, operation 530 involves sending a Get message from requester 102 to Web service 104. The Get message includes an address of the request resource, such as provided by the SOAP fault of operation 524. In another embodiment, operation 530 involves sending an enumerate message from requester 102 to Web service 104.

In another embodiment, operation 530 involves resubmitting the request made in operation 520, such as including a WS-SecureConversation context header associated with the request made in operation 520. The request is sent to the address provided by the response in operation 524.

Once the status query has been received by Web service 104, operation 532 is then performed. During operation 532, Web service 104 queries request resource 502 to determine the status of the request. In one example embodiment, request resource 502 is stored in a database. In this embodiment, operation 532 involves, for example, Web service 104 executing a Structured Query Language ("SQL") Select statement to request a representation of request resource 502. In another example embodiment, request resource 502 is an entry in a directory. In this embodiment, operation 532 involves Web service 104 executing an LDAP query.

Operation 534 is then performed during which the request resource 502 is returned to Web service 104. Web service 104 reads request resource 502 and determines the status of the request. For example, Web service 104 reads the "Status" element of request resource 502 to determine whether the request has been authorized or not. Once the status has been determined, operation 536 is performed, during which the status is communicated back to requester 102. In the illustrated embodiment, the request has not yet been authorized, and therefore Web service 104 sends a message stating that the request has not yet been authorized. In some embodiments, operation 536 involves sending a response to the Get or Enumerate message.

At some point after requester 102 makes the request of operations 402, authorizer 108 authorizes or denies the request. In the illustrated embodiment, authorizer 108 authorizes the request in operation 406. Operation 406 begins with operation 540, during which authorization is sent from authorizer 108 to Web service 104. In one embodiment, authorization is communicated from authorizer 108 to Web service 104 through a Put message. If authorizer 108 determines that the request should not be authorized, authorizer 108 sends a rejection message informing Web service 104 that the request will not be authorized. In one embodiment, the rejection is also communicated using a Put message. The Put message is used to update the Data element of a resource with the format defined by the example request resource schema. In another possible embodiment, a WS-SecureConversation token is provided, such as by utilizing MICROSOFT®.NET framework 3.5 and Durable Services.

In another possible embodiment, authorizer 108 responds to a request for authorization by creating a separate resource. As one example, authorizer 108 performs operation 540 by sending a WS-Transfer Create message. The create message acts to create a separate resource (an Approval Response resource) containing information describing a response to the request for authorization. An example schema for the ApprovalResponse resource is as follows.

EXAMPLE APPROVAL RESPONSE RESOURCE SCHEMA

```
<?xml version='1.0' encoding='utf-8'?>
<xs:schema
 elementFormDefault='qualified'
 targetNamespace='http://schemas.microsoft.com/2006/11/
IdentityManagement'
 xmlns:xs='http://www.w3.org/2001/XMLSchema'
 xmlns:idm='http://schemas.microsoft.com/2006/11/
IdentityManagement'>
 <xs:include
schemaLocation='http://sharepoint/sites/IdMT/Raven/
Shared%20Documents/Feature%20Team%20Documents/Schema/Schema/
Raven.Schema.IdentityManagementObject.Schema.M1.xsd' />
 <xs:complexType
  name='ApprovalResponseType'>
  <xs:complexContent
   mixed='false'>
   <xs:extension
    base='idm:ResourceType'>
    <xs:sequence>
     <xs:element
      name='Approver'
      minOccurs='1'
      maxOccurs='1'
      nillable='true'
      type='idm:Reference' />
     <xs:element
      name='Decision'
      minOccurs='1'
      maxOccurs='1'
      nillable='true'
      type='idm:ApprovalResponseDecisionType' />
     <xs:element
      name='Reason'
      minOccurs='0'
      maxOccurs='1'
      nillable='true'
      type='idm:String'/>
    </xs:sequence>
   </xs:extension>
  </xs:complexContent>
 </xs:complexType>
 <xs:simpleType name='ApprovalResponseDecisionType'>
  <xs:restriction base='xs:string'>
   <xs:enumeration value='Approved' />
   <xs:enumeration value='Rejected' />
  </xs:restriction>
 </xs:simpleType>
 <xs:element
  name='ApprovalResponse'
  nillable='true'
  type='idm:ApprovalResponseType' />
</xs:schema>
```

In the example Approval Response resource schema provided above, a number of elements are defined including Approver, Decision, and Reason. The Approver element contains a reference to authorizer 108. The Decision element contains a string that indicates a response from authorizer 108 to the request made in operation 520. In one embodiment, the Decision element has a value of either "Approved" or "Rejected." The reason element contains a text message from authorizer 108 providing additional information as to why the request was approved or rejected. Other embodiments include other resources and resource schemas.

In one embodiment, authorizer 108 determines that authorization is required, such as to initiate operation 406, by accessing a Web site that displays requests awaiting authorization. For example, Web service 104 acts as a Web server, and transmits the Web site to a browser operating on authorizer 108. In another embodiment, authorizer 108 runs a software application that periodically polls Web service 104 to check for requests waiting to be authorized. For example, a software application operates on authorizer 108 to periodically check for requests awaiting authorization. In another embodiment, Web service 104 communicates with authorizer 108 to inform authorizer 108 that a request awaits authorization. One example of this is described in U.S. patent application Ser. No. 11/931,004, titled "MODELING USER-INITIATED REQUESTS AND STATUS UPDATES WITHIN AN E-MAIL MESSAGE," filed Nov. 15, 2007, the entire disclosure of which is hereby incorporated by reference.

Operations 542 and 546 are then performed, during which Web service 104 retrieves a copy of request resource 502. In one example embodiment, request resource 502 is stored in a database. In this embodiment, operation 542 involves Web service 104 executing an SQL Select statement to request a representation of request resource 502. In another example embodiment, request resource 502 is an entry in a directory. In this embodiment, operation 542 involves Web service 104 executing an LDAP query. The requested resource is then returned to Web service 104 in operation 546.

Once authorization is received, operation 548 is then performed, during which the originally requested operation is performed involving protected resource 106. For example, a user name is added to a group distribution list. As described herein, many other operations can be performed by Web service 104.

After authorization is received, operation 550 is performed. In operation 550, Web service 104 updates the status of request resource 502. In one embodiment, this involves changing the status element of request resource 502 to indicate that authorization has been received for the request. In another embodiment, request resource 502 is updated with the result of operation 548, to record what happened when the requested operation was performed. For example, request resource 502 is updated in the status element to indicate that the request was authorized. As another example, request resource 502 is updated to show that a user name was added to a group distribution list. This is useful, for example, to provide a record of not only what operation was performed when the request was authorized, but also the result of the operation.

Operation 552 is performed after authorization is received. During operation 552, Web service 104 communicates with authorizer 108 to confirm receipt of the approval. In one embodiment, operation 552 involves sending a Put Response message from Web service 104 to authorizer 108. In alternate embodiments, operations 548, 550, and 552 can be performed in any order. For example, Web service 104 can update the status of request resource 502 prior to performing the requested operation in operation 548. In addition, operation 552 can be performed at any time following operation 540 to communicate to authorizer 108 that the authorization was successfully received.

Once authorization has been received, operation 408 is performed to communicate the fact of authorization to requester 102. Operation 408 is the same as operation 404, except that in operation 404 the requester was informed that the authorization had not yet been received, where in operation 408 the requester is informed that the authorization has been received. In possible embodiments, operation 404 is performed periodically until operation 406 is performed, indicating that the authorization has been received.

In the illustrated embodiment, operation 408 begins with operation 560, during which requester 102 sends a query to Web service 104 inquiring on the status of the request. In one embodiment, operation 560 involves sending a Get message from requester 102 to Web service 104. The Get message includes an address of the request resource, such as provided by the SOAP fault of operation 524. In another embodiment, operation 560 involves sending an Enumerate message from requester 102 to Web service 104. In another embodiment, operation 560 involves refreshing a Web page through a browser operating on requester 102.

Operations 562 and 564 are then performed, during which Web service 104 requests a copy of request resource 502 and receives a copy of request resource 502. In one embodiment, operation 562 involves Web service 104 querying request resource 502 to determine the status of the request. Operation 564 is then performed during which the request resource 502 is returned to Web service 104. Once request resource 502 has been retrieved by Web service 104, it reviews request resource 502 to determine the status of the request. In the illustrated example, the request has been authorized in operation 540. Therefore, operation 566 is performed to inform requester 102 that the request has been authorized. In one embodiment, operation 566 involves sending a response to the Get or Enumerate message. In some embodiments, the response includes information requested from the protected resource 106 by the original request (such as data from the data element).

Having described the embodiments of the present disclosure with reference to the figures above, it should be appreciated that numerous modifications may be made to the disclosed embodiments that will readily suggest themselves to those skilled in the art and which are encompassed within the scope and spirit of the disclosure. Indeed, while a presently preferred embodiment has been described for purposes of this disclosure, various changes and modifications may be made which are well within the scope of the present disclosure.

Similarly, although this disclosure has used language specific to structural features, methodological acts, and computer-readable media containing such acts, it is to be understood that the subject matter defined in the appended claims is not necessarily limited to the specific structure, acts, features, or media described herein. Rather, the specific features and acts described above are disclosed as example forms of implementing the claims. One skilled in the art will recognize other embodiments or improvements that are within the scope and spirit of the present disclosure. Therefore, the specific structure, acts, or media are disclosed as exemplary embodiments only.

What is claimed is:

1. A computing system for controlling access to a protected Web service resource, the computing system comprising:
 a communication device for communicating across a communication network;
 a processor communicatively connected to the communication device; and
 memory storing program instructions, which when executed by the processor cause the computing system to perform operations comprising:
  receiving a request to access a protected Web service resource from the communication network;
  generating and storing a request resource associated with the request in memory, the request resource containing data that identifies whether the request has been authorized, the request resource including a request element storing a copy of a status element, a details element, an approval processes element, and a data element;
  determining whether the request to access the protected Web service resource has been authorized;

if the request has not been authorized, denying access to the protected Web service resource; and if the request has been authorized, permitting access to the protected Web service resource.

2. The computing system of claim 1, wherein receiving the request comprises receiving a create message.

3. The computing system of claim 2, wherein, upon receiving the create message, the instructions cause the computing system to perform operations comprising:

determining whether authorization is required to access the protected Web service resource; and generating and storing a resource request associated with the request to store data relating to a status of the request.

4. The computing system of claim 1, wherein the request resource is defined by an extensible markup language.

5. The computing system of claim 1, wherein the request resource comprises:

a first element that stores an identifier of an operation to be performed; and a second element that stores an identifier of a current status of the request to access the protected Web service resource.

6. The computing system of claim 1, wherein determining whether the request to access the protected Web service resource has been authorized comprises retrieving the data that identifies whether the request has been authorized from the request resource.

7. The computing system of claim 1, wherein denying access to the protected Web service resource comprises sending a fault message across the network.

8. The computing system of claim 1, wherein permitting access to the protected Web service resource further comprises an operation selected from the group comprising modifying the protected resource, adding to the protected resource, deleting the protected resource, and using the protected resource.

9. A method of authorizing access to a Web service resource, the method comprising:

receiving a request from a requester identifying a Web service resource;

determining, with a computing device, that authorization is required to access the Web service resource;

generating and storing a resource request associated with the request in memory, the request resource containing data that identifies whether the request has been authorized, the request resource including a request element storing a copy of a status element, a details element, an approval processes element, and a data element;

receiving authorization from an authorizer which authorizes the requester to access the Web service resource; and communicating the authorization to the requester.

10. The method of claim 9, further comprising:

receiving a second request from the requester identifying the Web service resource;

determining that the second request has been authorized by the authorizer; and providing access to the Web service resource.

11. A method of claim 9, further comprising generating the request resource after determining that authorization is required.

12. The method of claim 11, further comprising updating the request resource after receiving authorization from the authorizer with data indicating that the request has been authorized by the authorizer.

13. The method of claim 11, wherein the resource request is generated in an extensible markup language.

14. A computer readable storage medium containing computer executable instructions which when executed by a computer perform a method of authorizing access to a protected resource, the method comprising:

receiving a request from a requester identifying the protected resource of a Web service;

generating and storing a request resource associated with the request in memory wherein the request resource is defined by an extensible markup language, the request resource containing data that identifies whether the request has been authorized, the request resource including a request element storing a copy of a status element storing a status of the request, a details element storing a description of the request, an approval processes element storing identifiers of approval processes associated with the request, and a data element storing data to be retrieved by the request;

receiving an authorization which authorizes use of the protected resource of the Web service;

determining that the request has been authorized; and communicating the authorization to the requester.

15. The computer readable storage medium of claim 14, the method further comprising allowing access to the protected resource after determining that the request has been authorized.

16. The computer readable storage medium of claim 14, the method further comprising generating and storing the resource request after receiving a request identifying the protected resource of the Web service.

17. The computer readable storage medium of claim 16, the method further comprising updating the resource request after receiving the authorization to indicate that the request has been authorized.

18. The computer readable storage medium of claim 17, wherein determining that the request has been authorized comprises retrieving data from the resource request and determining that the data indicates that the request has been authorized.

* * * * *